Patented Aug. 9, 1938

2,126,113

UNITED STATES PATENT OFFICE 2,126,113

CELLULOSE DERIVATIVE COMPOSITION

Ralph A. Jacobson, Wilmington, Del., assignor to E. I. du Pont de Nemours & Company, Wilmington, Del., a corporation of Delaware No Drawing. Application August 8, 1935, Serial No. 35,303

5 Claims. (Cl. 106—40)

This invention relates to new compositions of matter, more particularly to branched chain alkyl carbamates and their preparation, and still more particularly to plasticized compositions containing these carbamates.

An object of this invention is the preparation of branched chain alkyl carbamates and their use in the formulation of plasticized compositions containing cellulose derivatives. Other objects of the invention will be apparent by reference to the following specification in which its details and preferred embodiments are set forth.

According to the present invention valuable higher molecular weight branched chain alcohol esters of carbamic acid are prepared by reacting the branched chain alcohols boiling above methanol and obtained by the catalytic pressure hydrogenation of carbon oxides with a carbamate-forming reagent, the character of which will be apparent from the subsequent description. The carbamate mixture so obtained is then blended with cellulose derivatives to form coating and plastic compositions.

The methods of this invention, although hereinafter illustrated by examples involving certain specific fractions of alcohols obtainable as above described, may be applied generally to the complete mixture or fractions thereof, of the higher branched chain aliphatic alcohols obtainable by the catalytic pressure hydrogenation of oxides of carbon. Although all of the alcohols in the complete mixture of alcohols so obtained, boiling above methanol, have not been individually identified, the following have been either positively identified or are believed to be present: isobutanol, 3-methylbutanol-2, 2-methylbutanol-1, 2-methylpentanol-3, 2-methylpentanol-1, 2,4-dimethylpentanol-3, 2,4-dimethylhexanol-3, 2,4-dimethylpentanol-1, 2,4-dimethylhexanol-3, 4-methylhexanol-1, 2,4-dimethylhexanol-1, and 4-methylheptanol-1.

The carbamic acid esters prepared according to this invention are readily soluble in the usual organic solvents and are miscible with a wide variety of materials commonly used in the preparation of plasticized compositions. A number of methods have been found suitable for the preparation of the branched chain alkyl carbamates among which are: the reaction of the alcohol mixture with urea; the reaction of the alcohol mixture with phosgene followed by reaction with ammonia; ester interchange between the alcohol mixture and a lower alkyl carbamate; as well as the reaction of the alcohol mixture with cyanic acid. The following examples illustrate the preparation of branched chain alkyl carbamates by some of these various methods:

Example 1

Twenty six hundred sixteen grams of the fraction of alcohols boiling in the range of about 135–152° C. at 760 mm. pressure, obtainable by the catalytic pressure hydrogenation of oxides of carbon, was stirred with 180 grams of urea at 135° C. for about eight hours. An additional 180 grams of urea was thereafter added and the stirred mixture further heated at 135–145° C. for 16 hours. During the heating ammonia was liberated and some solid urea decomposition products accumulated in the reflux condenser and in the flask. The solid was removed by filtration and weighed 150 grams. The resultant mixture of carbamate and alcohol was fractionated under reduced pressure using a two foot column. The distillate consisted of 1,943 grams of unreacted and excess alcohols and 569 grams of carbamate (a yield of 62.5% based on the urea), the latter product probably being a mixture of carbamates of the initial mixture of alcohols boiling in the range 135–152° C. This carbamate mixture boiled at 85–90° C. at 2 mm. pressure and was found on analysis to contain 8.47% nitrogen. Based on an average carbon content of 6.5 carbon atoms per molecule of alcohol, the calculated nitrogen content is 9.23%. The carbamate produced was a substantially colorless liquid which partially solidifies at room temperature. It was soluble in common organic solvents such as dioxan, ethanol, and acetone.

Example 2

A mixture of 178 grams of ethyl carbamate, 684 grams of the fraction of alcohols boiling in the range of 165–190° C. at 760 mm. pressure (obtainable by the catalytic pressure hydrogenation of oxides of carbon), and 9 grams litharge was heated to boiling under a fractionating column until the product at the head of the column was boiling at a temperature of 78° C. Distillation was continued as long as product could be obtained at 78° C. During about three hours 11 cc. of such material distilled, after which time the temperature in the top of the column rose rapidly towards the boiling range of the alcohols. During the early stages of the heating some white material condensed in the condenser. The final distillate was filtered, washed with water, and redistilled. There was obtained 274 grams of liquid mixed carbamates which boiled at 120–138° C. at 9 mm. pressure.

Example 3

To 100 grams of phosgene dissolved in 200 grams toluene was added with stirring 400 grams of the fraction of alcohols boiling in the range 200–250° C. and obtainable by the catalytic pressure hydrogenation of oxides of carbon. After the evolution of hydrogen chloride had ceased, the product was poured into excess ammonia solution containing ice. After thorough stirring to insure complete reaction of the chlorocarbonate of the alcohols with ammonia, the carbamate and excess alcohol were separated from the water layer and purified by distillation in the usual manner.

The following equations are given as general illustrations of the reactions which are believed to take place when following the methods of Examples 1, 2, and 3 respectively, the symbol R in these equations representing the branched chain alkyl radicals of the alcohol mixture employed:

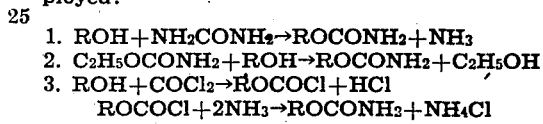

A fourth method of making these carbamates (not illustrated by an example) is to react the alcohol ROH with cyanic acid.HCNO whereby the carbamate ROCONH$_2$ is formed as a direct addition product.

The alcohol mixture employed to make the carbamates of this invention may be that obtained from the aforementioned source and boiling in the range 135–250° C. or may be any fraction of this mixture.

The branched chain alkyl carbamates of this invention are admirably suited to the plasticization of cellulose derivatives, such as cellulose acetate, cellulose propionate, cellulose butyrate, cellulose nitrate, benzyl cellulose and the like. Such compositions may be employed as coatings or for molding, or may be formed into unsupported films and foils. These compositions have a peculiar combination of properties in being very tough without attendant pliability, and this renders them suitable for many commercial uses for which entirely satisfactory compositions have not heretofore been available.

Useful cellulose derivative compositions containing the carbamates of this invention may be formulated with amounts of the latter varying from 5 to 200 per cent based on the weight of the cellulose derivative. These compositions may optionally contain solvents, pigments, natural and synthetic resins compatible therewith, and other plasticizers, illustrations of the latter being triaryl phosphates, dialkyl phthalates, partial esters of glycerol with lower fatty acids, etc.

Examples of typical cellulose derivative compositions containing the herein-described carbamates are as follows:

Example 4

| | Parts |
|---|---|
| Cellulose acetate (containing 52% combined acetic acid) | 100 |
| Carbamate of Example 1 | 50 |

Example 5

| | Parts |
|---|---|
| Cellulose acetate (containing 56.5% combined acetic acid) | 100 |
| Carbamate of Example 2 | 20 |
| Acetone | 575 |

Example 6

| | Parts |
|---|---|
| Cellulose acetate (containing 61–62% combined acetic acid) | 15 |
| Carbamate of Example 2 | 3 |
| Methanol | 8 |
| Ethylene chloride | 74 |

Example 7

| | Parts |
|---|---|
| Cellulose nitrate | 20 |
| Carbamate of Example 3 | 6 |
| Dioxan | 80 |

Example 8

| | Parts |
|---|---|
| Ethyl cellulose | 100 |
| Carbamate of Example 1 | 30 |

The compositions of Examples 4 and 5 are formulated with acetone-soluble cellulose acetate and are suitable for molding or for making photographic film. The composition of Example 6 is designed for use in the preparation of artificial bristles. The compositions of Examples 4, 5 and 6 also can be cast in various manners into filaments, films or foils. Example 7 illustrates a typical lacquer, films therefrom being very tough and durable. The composition of Example 8 is a good all-purpose molding plastic.

The following table gives in condensed form the properties of these films cast from the compositions of Examples 4 and 5 in comparison with certain standard compositions, designated A and B:

| | Composition of Example 4 | Composition of Example 5 | Standard A | Standard B |
|---|---|---|---|---|
| Film thickness | 0.003 inch | 0.003 inch | 0.003 inch | 0.003 inch |
| Drying conditions | 3 days at 65° C. | 3 days at 65° C. | 3 days at 65° C. | 3 days at 65°C. |
| Tensile strength (lbs./sq. in.) | 6740 | 7440 | 3490 | 8220 |
| Pliability (reciprocal lbs./sq. in.) | 2.87×10$^{-6}$ | 2.35×10$^{-6}$ | 5.8×10$^{-6}$ | 2.29×10$^{-6}$ |
| Crack length (miles crack test—cor. to 0.005″ film thickness) | 2.1 inches | 2.8 inches | 3.7 inches | 5.0 inches |

Standard A in the above table is a cellulose acetate composition analogous to that of Example 4 but containing dimethoxyethyl phthalate as a plasticizer. Standard B is like Example 5 but contains triphenyl phosphate.

Various changes may be made in the details and methods of this invention without departure therefrom or sacrificing any of the advantages thereof.

I claim:

1. A plasticized cellulose derivative composition containing as a plasticizer the carbamates, obtained by reaction with a carbamate-forming reagent, of that fraction of the mixture of branched chain aliphatic alcohols obtained by the catalytic pressure hydrogenation of oxide of carbon which boils in the range of 135-250° C.

2. A plasticized cellulose acetate composition containing as a plasticizer the carbamates, obtained by reaction with a carbamate-forming reagent, of that fraction of the mixture of branched chain aliphatic alcohols obtained by the catalytic pressure hydrogenation of oxide of carbon which boils in the range of 135-250° C.

3. A plasticized cellulose nitrate composition containing as a plasticizer the carbamates, obtained by reaction with a carbamate-forming reagent, of that fraction of the mixture of branched chain aliphatic alcohols obtained by the catalytic pressure hydrogenation of oxide of carbon which boils in the range of 135-250° C.

4. A plasticized ethyl cellulose composition containing as a plasticizer the carbamates, obtained by reaction with a carbamate-forming reagent, of that fraction of the mixture of branched chain aliphatic alcohols obtained by the catalytic pressure hydrogenation of oxide of carbon which boils in the range of 135-250° C.

5. A mixture of carbamates, obtained by reaction with a carbamate-forming reagent, of that fraction of the mixture of branched chain aliphatic alcohols obtained by the catalytic pressure hydrogenation of oxide of carbon which boils in the range of 135-250° C.

RALPH A. JACOBSON.